United States Patent
Gilor

(10) Patent No.: US 9,167,086 B1
(45) Date of Patent: Oct. 20, 2015

(54) BLUETOOTH HEADSET WITH AUDIO RECORDING CAPABILITIES

(71) Applicant: Avraham Gilor, San Diego, CA (US)

(72) Inventor: Avraham Gilor, San Diego, CA (US)

( * ) Notice: Subject to any disclaimer, the term of this patent is extended or adjusted under 35 U.S.C. 154(b) by 0 days.

(21) Appl. No.: 14/532,916

(22) Filed: Nov. 4, 2014

Related U.S. Application Data

(60) Provisional application No. 62/054,287, filed on Sep. 23, 2014.

(51) Int. Cl.
| | |
|---|---|
| *H04R 1/10* | (2006.01) |
| *H04R 1/02* | (2006.01) |
| *H04R 9/06* | (2006.01) |
| *H04R 1/00* | (2006.01) |
| *H04M 3/42* | (2006.01) |
| *H04W 4/00* | (2009.01) |
| *H04B 5/00* | (2006.01) |

(52) U.S. Cl.
CPC ......... *H04M 3/42221* (2013.01); *H04B 5/0031* (2013.01); *H04W 4/008* (2013.01)

(58) Field of Classification Search
CPC .. H04R 5/033; H04R 1/1041; H04R 2420/07; H04R 2499/11; H04M 3/42221; H04M 1/6058; H04M 1/6066; H04W 4/008; H04B 5/0031
USPC .......... 381/74, 334; 700/94; 455/569.1, 41.1, 455/41.2, 41.3, 100, 575.2
See application file for complete search history.

(56) References Cited

U.S. PATENT DOCUMENTS

| | | | | |
|---|---|---|---|---|
| 4,969,069 | A | * 11/1990 | Eichost | 362/105 |
| 8,155,336 | B2 | * 4/2012 | Tang | 381/74 |
| 2012/0172004 | A1 | * 7/2012 | Silva | 455/412.1 |

OTHER PUBLICATIONS

"Call Mynah Cell Phone Recorder," http://www.callmynah.com, retrieved Dec. 30, 2014, 2 pages.
"Covert Voice Activated Telephone Voice Recorder with Bluetooth," http://www.eyespysupply.com/covert-voice-activated-telephone-voice-recorder-with-bluetooth.html?ref=lexity&, visited Dec. 30, 2014, 3 pages.
"Bluetooth Mobile Phone Recorder," http://www.brickhousesecurity.com/product/bluetooth+mobile+phone+recorder.do, visited Dec. 30, 2014, 2 pages.

\* cited by examiner

*Primary Examiner* — Vivian Chin
*Assistant Examiner* — Douglas Suthers
(74) *Attorney, Agent, or Firm* — Klarquist Sparkman, LLP

(57) ABSTRACT

Wireless headsets with audio recording capabilities are disclosed. The wireless headsets with audio recording capabilities can include a microphone for receiving first audio signals generated by a user, a BLUETOOTH module for transmitting and receiving wireless radio signals, wherein the wireless radio signals received by the BLUETOOTH module comprise second audio signals. The headsets can also include an audio encoder/decoder for encoding the first audio signals received by the microphone and the second audio signals received by the BLUETOOTH module to generate data, a loudspeaker, connected to the audio encoder/decoder, for playing the second audio signals to the user, a memory unit for storing the data generated by the audio encoder, and a control unit which is coupled to the audio encoder/decoder for transferring the data to the memory unit.

12 Claims, 9 Drawing Sheets

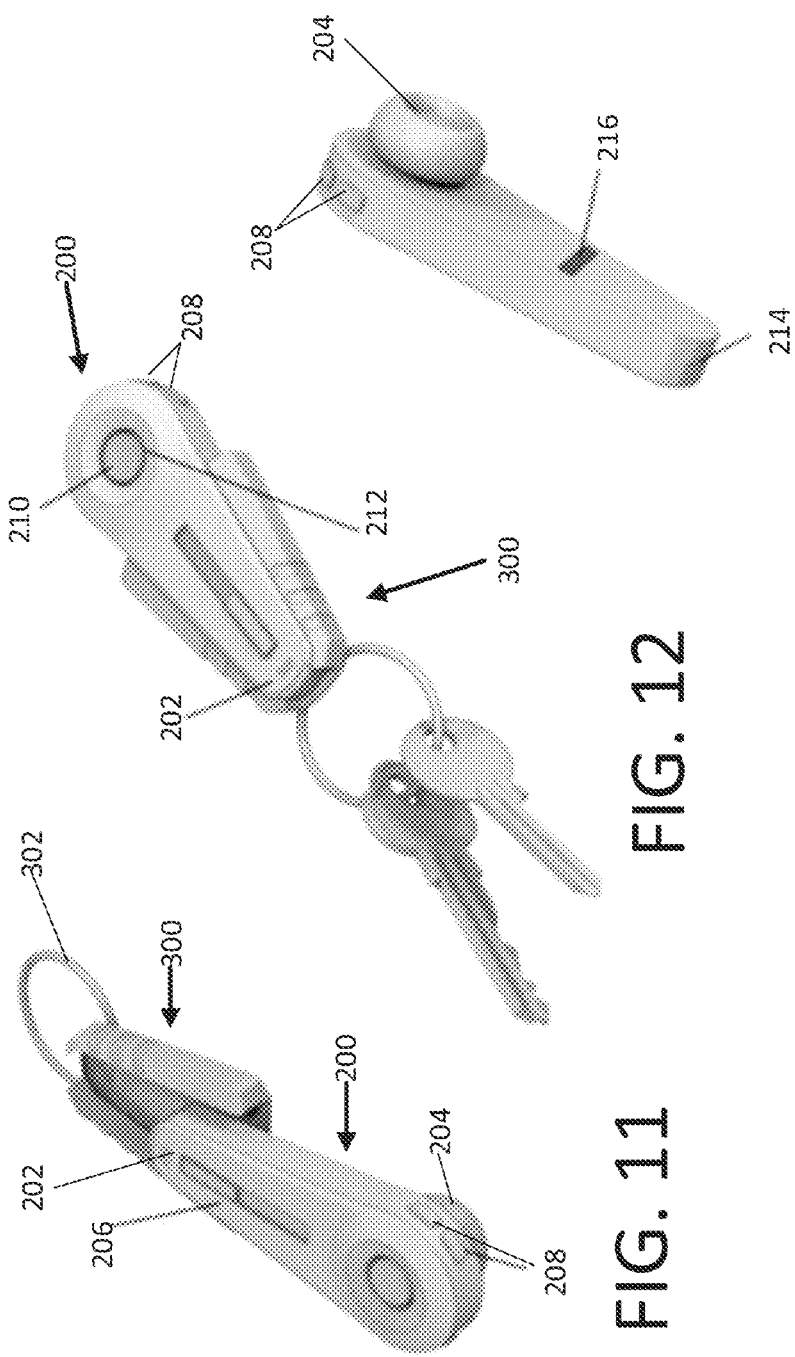

BLUETOOTH HEADSET WITH AUDIO RECORDING CAPABILITIES

CROSS REFERENCE TO RELATED APPLICATION

This application claims the benefit of U.S. Provisional Application Ser. No. 62/054,287, entitled BLUETOOTH HEADSET WITH AUDIO RECORDING CAPABILITIES, filed on Sep. 23, 2014, which is incorporated by reference herein.

FIELD

The present disclosure relates generally to a BLUETOOTH headset, and more particularly, to a headset with novel audio recording capabilities.

BACKGROUND

People frequently need recordings of their conversations for a variety of purposes, including reference, legal, or quality assurance purposes. People also frequently need "hands-free" mobile communication devices hands while in the car, at work, etc. Recording technology for "wired" communication devices is readily available. "Hands-free" mobile communication devices such as wireless headsets or earpieces that connect to the user's mobile telephone are also readily available, BLUETOOTH headsets being one example.

The ability to record conversations while communicating over a wireless headset, however, is significantly limited. Some recording devices wirelessly connect to mobile communication devices but require a separate headset to be connected by wire to the recording device. These devices only record the conversation if the users is speaking directly into the headset and do not allow the user to wirelessly transfer the recording back to the mobile device. Some mobile communication devices use applications to save the conversation in "cloud-based" storage. These applications do not record conversations made over a wireless headset and can be expensive and insecure. Additionally, none of these recording devices allow you to record a conversation while the user is communicating over another wirelessly connected device.

Thus, what is needed is a wireless headset with built-in recording and storage capabilities that can also allow a user to communicate over additional wirelessly connected devices and wirelessly transfer recordings, even if the wireless headset is not being used as the communication device.

SUMMARY

As described herein, the various wireless headsets with built-in recording and storage capabilities can provide improved operation over conventional wireless headset devices.

In one embodiment, a BLUETOOTH headset device capable of recording audio signals is provided. The device comprises a microphone for receiving first audio signals generated by a user, a BLUETOOTH module for transmitting and receiving wireless radio signals, the format of the wireless radio signals being compliant with a BLUETOOTH specification, and wherein the wireless radio signals received by the BLUETOOTH module comprise second audio signals, an audio encoder/decoder for encoding the first audio signals received by the microphone and the second audio signals received by the BLUETOOTH module to generate data, a loudspeaker, connected to the audio encoder/decoder, for playing the second audio signals to the user, a memory unit for storing the data generated by the audio encoder, and a control unit which is coupled to the audio encoder/decoder for transferring the data to the memory unit.

In some embodiments, the wireless signals received by the BLUETOOTH module can be transmitted from a mobile communication device, including a mobile telephone. In some embodiments, the wireless signals received by the BLUETOOTH module can be transmitted from a computer.

In some embodiments, the control unit can convert the data generated by the audio encoder/decoder from a first format to a second data format prior to transferring the data to the memory unit. In some cases, the second data format can be a compressed data format relative to the first data format, including MP3 format. In some cases, the second data format can be an encrypted data format.

In some embodiments, the BLUETOOTH module can transmit the data stored on the memory unit to a second device (e.g., a mobile communication device) over a BLUETOOTH specification, wherein the second device receives the data with the BLUETOOTH module of the second device, decodes the data into audio signals, wherein the second device comprises an audio encoder/decoder for decoding the data received by the BLUETOOTH module, and plays the audio signals over a loud speaker of the second device, wherein the second device comprises a loud speaker.

In some embodiments, the device also includes a near-field communication module for transmitting the data stored in the memory unit to a second device, wherein the second device comprises a near-field communication module for receiving the data transmitted to the second device from the near-field communication module of the BLUETOOTH headset device, an audio encoder/decoder for decoding the data received by the near-field communication module of the second device into audio signals, and a loud speaker for playback of the audio signals. An accelerometer module can also be provided, wherein the accelerometer module can be configured to receive an input from the user, interpret the input to generate an output signal, and send the output signal to the BLUETOOTH module, and the BLUETOOTH module can transmit the output signal to another device comprising a BLUETOOTH module which can receive the output signal to generate feedback to the user based on the input provided by the user. The device can also include, in some embodiments, a flashlight.

In another embodiment, a method is provide for recording audio on a recording device. The method comprises pairing a recording device with a communication device, wherein the recording device and the communication device each comprise a BLUETOOTH module for transmitting and receiving wireless signals, capturing audio signals received by and transmitted from the communication device, converting the captured audio signals into data, sending the converted data from the communication device to the headset as wireless signals, wherein the wireless signals are compliant with a BLUETOOTH specification, and storing the data on the recording device, wherein the recording device comprises a memory unit for storing data.

In some embodiments, the communication device mobile used in the method can be a mobile communication device, including a mobile telephone. The communication device can also be a computer. In other embodiments, the data converted by the audio encoder/decoder is converted into a compressed data format, including MP3 format.

In some embodiments, the method can also include transmitting the data stored in the memory unit of the BLUETOOTH headset device to a second device, wherein the BLUETOOTH headset device comprises a transmitter module, receiving the transmitted data on the second device, wherein the second device comprises a transceiver corresponding to the transmitter of the BLUETOOTH headset device for receiving the data transmitted to the second device from the BLUETOOTH headset device, an audio encoder/decoder for decoding the data received by transceiver of the second device into audio signals, and a loud speaker for playback of the audio signals, decoding the data into audio signals with the second device, and playing the audio signals on the second device. In some cases, the data is transmitted from the BLUETOOTH headset device and received by the second device using near-field communication.

In another embodiment, a method is provide for recording audio transmitted over BLUETOOTH. The method comprises connecting a first device to a communication device, using a first BLUETOOTH protocol, wherein the first device and the communication device each comprise a BLUETOOTH module, and the first device also includes an encoding/decoding module, connecting a second device to the communication device, using a second BLUETOOTH protocol, wherein the second device comprises a BLUETOOTH module, encoding/decoding module, a recording module, and a memory unit, capturing audio signals transmitted or received between the first device and the communication device over the first BLUETOOTH protocol on the first device, converting the audio signals captured by the first device into data using the encoding/decoding module of the first device, transmitting the data to the second device over the second BLUETOOTH protocol, receiving the data transmitted to the second device with the BLUETOOTH module of the second device, recording the data received on the second device, using the recording module, and storing the recorded data on the memory unit of the second device.

In some embodiments, the first device is a car which comprises a BLUETOOTH module, the communication device is a mobile communication device including a mobile telephone. In some embodiments, the second communication device is a BLUETOOTH headset. In some embodiments, the method also includes requesting at least some of the data stored on the memory unit of the second device be transferred to the communication device, sending the data to the communication device over a BLUETOOTH protocol, decoding the data received by the communication device into audio signals, and playing the audio signals on the communication device, wherein the communication device comprises a loud speaker configured to play audio signals.

The foregoing and other objects, features, and advantages of the invention will become more apparent from the following detailed description, which proceeds with reference to the accompanying figures.

BRIEF DESCRIPTION OF THE DRAWINGS

FIGS. 11-13 are perspective views of a wireless headset, according to another embodiment.

DETAILED DESCRIPTION

A wireless headset is a communication device that may communicate wirelessly with a base device and may be worn proximate to a user's head. Communication between the base device and the wireless headset comprises audio signals, which may include speech, music, or other types of audio transmissions exchanged using short wavelength radio transmissions, BLUETOOTH being one example. The term "BLUETOOTH" as used herein includes all BLUETOOTH Core Specification versions. For example, "BLUETOOTH" includes BLUETOOTH version 4.0.

As used herein, the term "signal transfer protocol" refers to a communication protocol capable of transferring data in a wireless manner, such as the BLUETOOTH communication protocols described herein. As used herein, a "signal transfer module" is a device that allows the transfer of data using any such signal transfer protocol.

Figure 1:
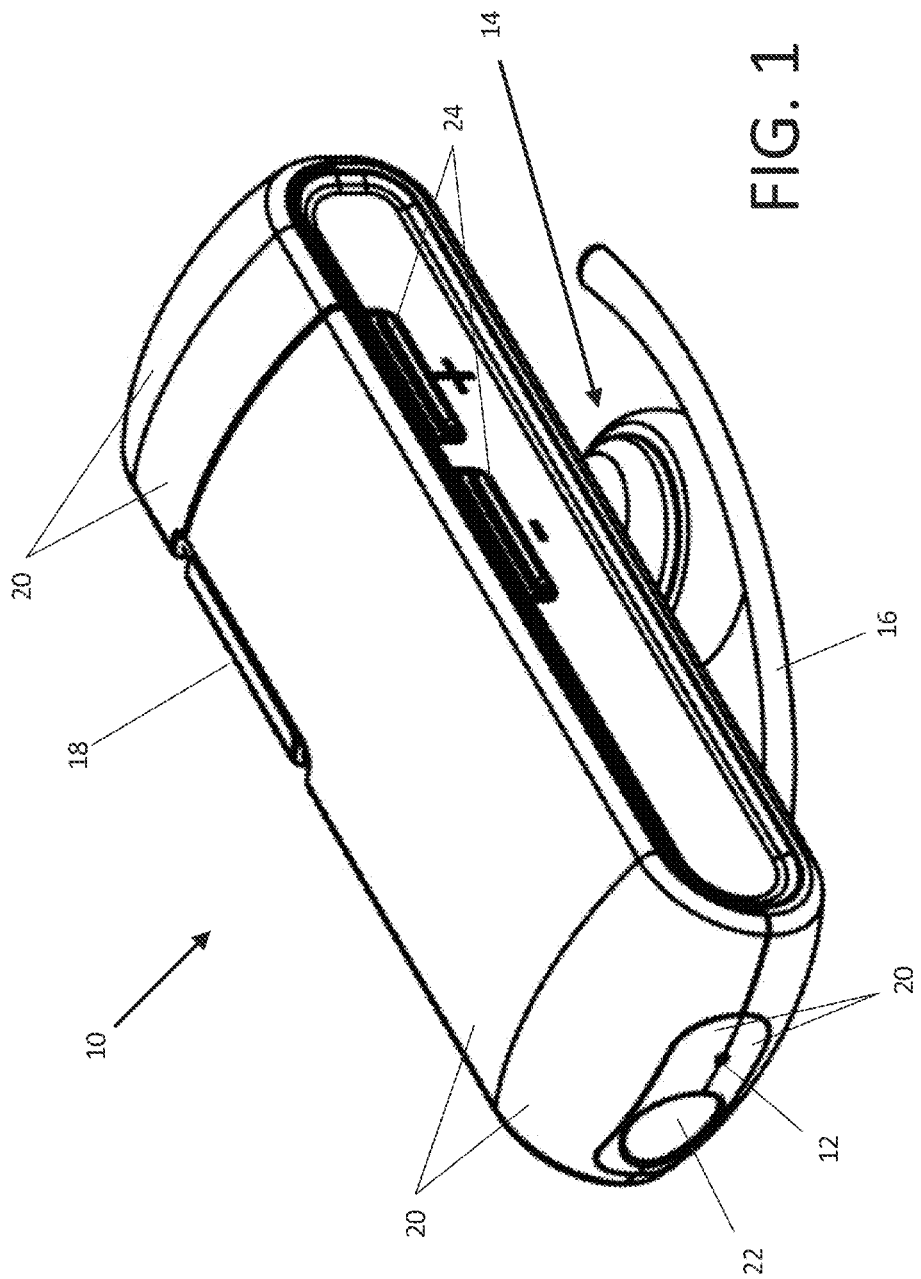
FIG. 1 is a perspective view of a wireless headset, according to one embodiment.

Referring first to FIGS. 1-10, there is shown a wireless headset 10, according to one embodiment. In FIG. 1, for example, the wireless headset 10 comprises a microphone 12, a loudspeaker 14, and a clip 16. The wireless headset 10 can be configured to be worn by the user in such a way that an audio signal produced by the user can be received by the microphone 12 and that an audio signal provided by the loudspeaker 14 is audible for the user. The clip 16 can be attached or fixedly secured to the wireless headset 10, which allows the wireless headset 10 to be connected to the user's ear. For example, clip 16 can be a separate component that can be attached to the wireless headset 10 by gluing, mounting, press fitting, or integrally formed from a unitary component, thereby connecting the clip 16 to the wireless headset 10. The microphone 12 can be housed in a portion of the wireless headset 10 such that it is proximate to mouth of the user when the wireless headset 10 is being worn by the user. The loudspeaker 14 can be a protrusion (or other appropriate structure) attached or fixedly secured to the wireless headset 10 and configured to be inserted into the user's ear when the wireless headset 10 is being worn be the user.

In one embodiment, the wireless headset 10 comprises a switch 18, a plurality of cover panels 20, a flashlight 22, and a plurality of buttons 24. The switch 18 can be configured, for example, to select the desired functionality of wireless headset 10, such as power on/off, accept/reject call, record/no record, and/or other functions relating to the wireless headset. In some embodiments of the invention, however, the switch 18 is not present; whereas, in some embodiments a plurality of switches and/or other input devices may be provided. In some embodiments, the switch 18 may be configured to respond to the duration of the key press, meaning the length of time that the user holds down the switch. For example, a short key press on switch 18 can actuate a particular functionality of the wireless headset 10 function, while a long key press on switch 18 can actuate another functionality of the wireless headset 10.

Figure 2:
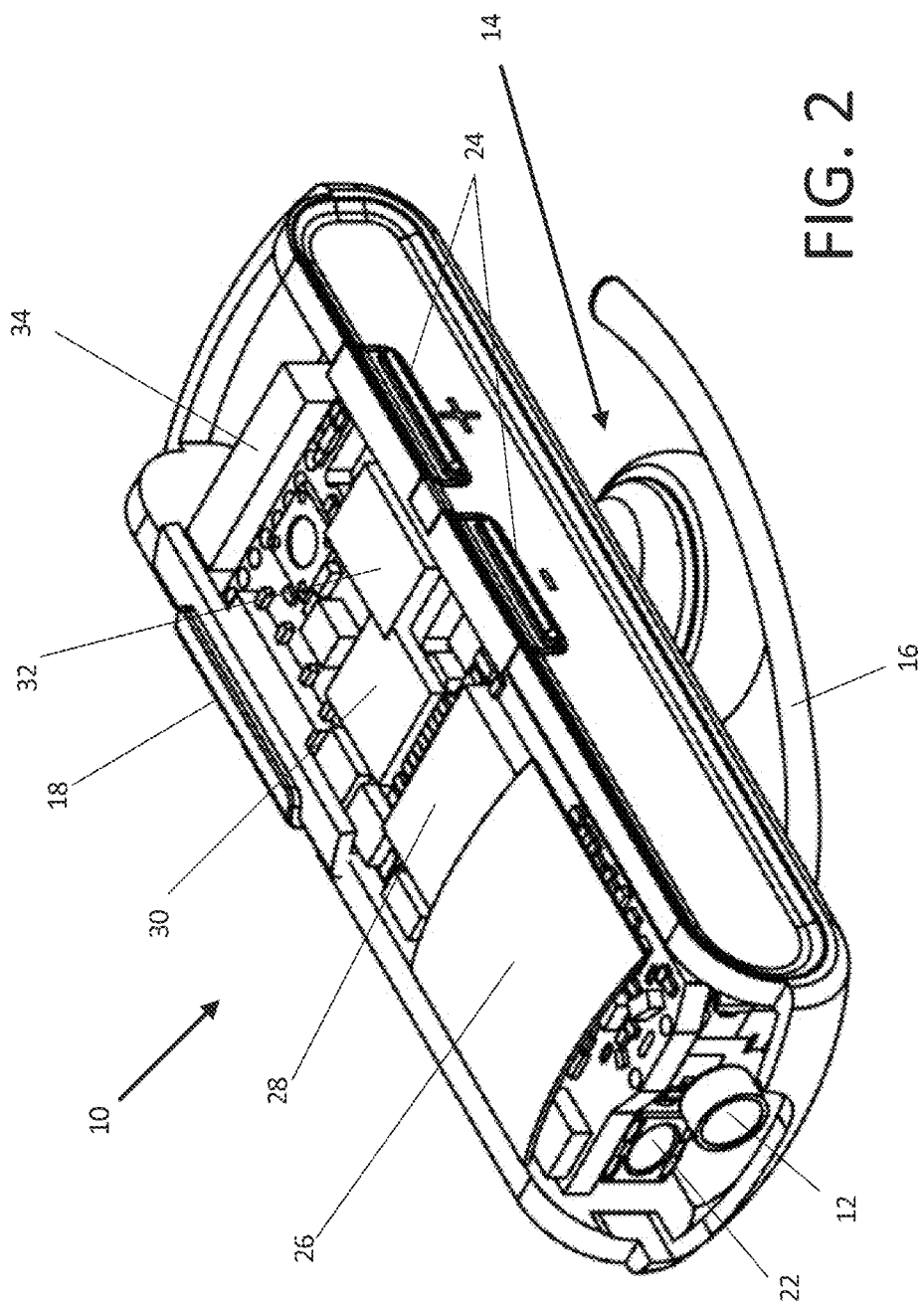
FIG. 2 is a perspective view of the wireless headset of FIG. 1, shown with a side panel removed.

FIG. 2 shows the wireless headset 10 with the plurality of cover panels 20 (not shown) removed, exposing some of the internal components of wireless headset 10. The internal components of wireless headset 10 can comprise a wireless charging module, including a wireless charging antenna 26, a processor 28, an accelerometer 30, a near field communication ("NFC") module including an NFC antenna 32, a tactile element 34, a BLUETOOTH module, an audio encoder/decoder, and a memory unit. For example, wireless charging antenna 26 can be provided to allow wireless headset 10 to be charged by inductive chargers. Accelerometer 30 can be configured, for example, such that when the user rapidly oscillates or shakes the wireless headset 10, the wireless headset 10 can send a signal to the mobile communication device. For example, this feature could be used to locate the user's mobile communication device if it is lost. Accelerometer 30 can also be configured, to change the operational state of the wireless headset 10. For example, accelerometer 30 can be configured to change the wireless headset 10 from a power-off or reduced power consumption state, such as sleep, to a power-on state. The tactile element 34 can for example comprise a vibrating element. The tactile element 34 can be configured such that when the wireless headset 10 exceeds the BLUETOOTH range of the devices, the tactile element vibrates to inform the user that the wireless headset and the mobile communication device are disconnected. Other components are discussed in greater detail below. It should be noted that the term "BLUETOOTH module" as used herein includes a BLUETOOTH antenna which can be used to send and receive wireless signals over a BLUETOOTH specification.

Figure 3:
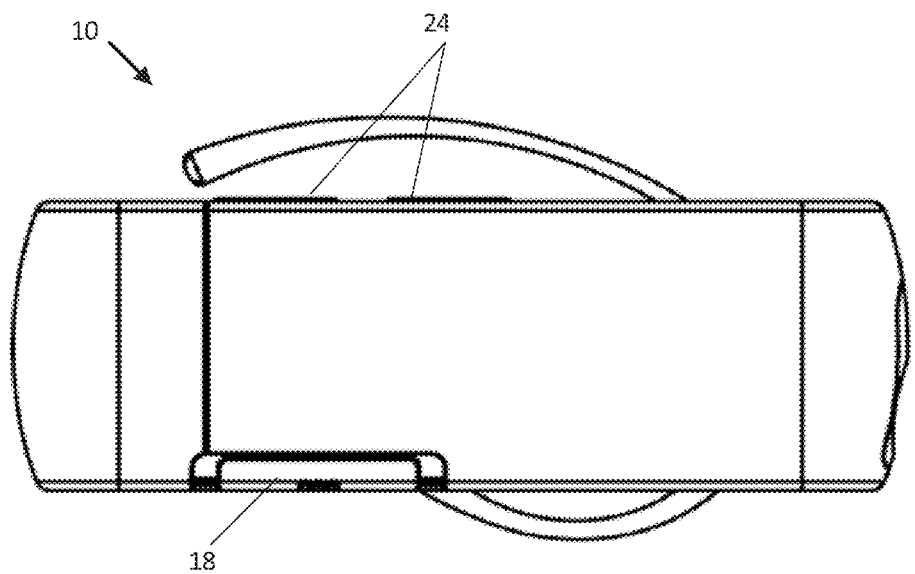
FIG. 3 is a side plan view of the wireless headset of FIG. 1, showing the side facing away from the wearer when in use.

FIG. 3 shows the side of the wireless headset 10 that faces generally outward from the user when being worn by a user, the plurality of buttons 24 being generally located toward the top of wireless headset 10 and the switch 18 being generally located toward the bottom of wireless headset 10.

Figure 4:
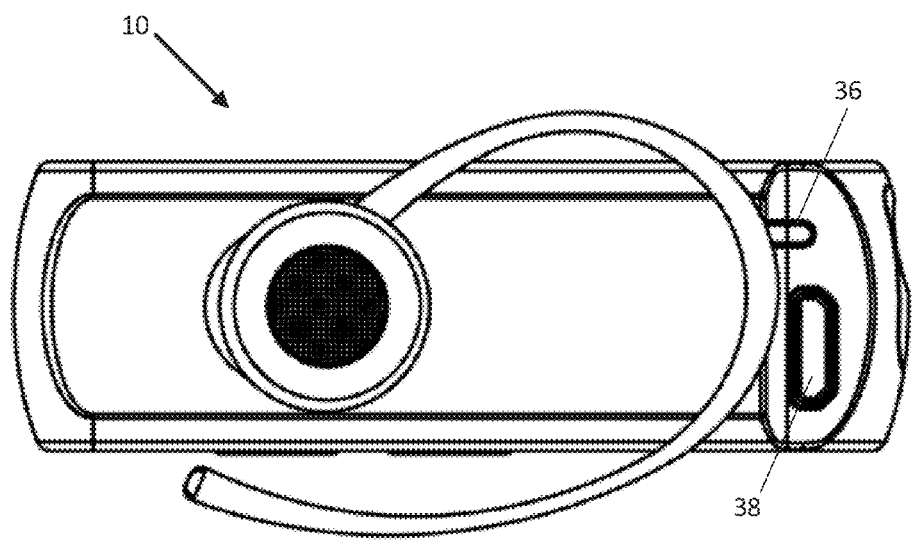
FIG. 4 is a side plan view of the wireless headset of FIG. 1, showing the side facing towards the wearer when in use.

FIG. 4 shows the side of the wireless headset 10 (opposite to the side shown in FIG. 3) that faces generally inward toward the user when being worn by a user. FIG. 4 also illustrates that the wireless headset 10 can comprise a port 36 and a light 38. For example, port 36 can be a micro-Universal Serial Bus ("USB") (e.g., USB OTG) port through which the battery of wireless headset 10 is can be charged or recording files can be transferred to another device. In some embodiments, light 38 can be a light-emitting diode ("LED") that can indicate the charging status of wireless headset 10. Light 38 can also be configured to indicate other statuses of wireless headset 10, such as storage capacity remaining, recording status, etc.

Figure 5:
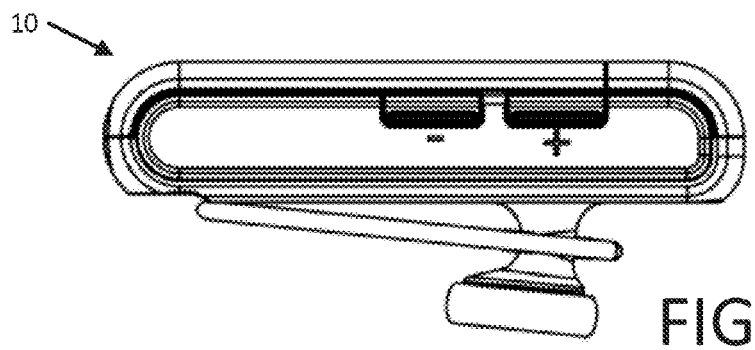
FIG. 5 is a top plan view of FIG. 1 of the wireless headset of FIG. 1.
Figure 6:
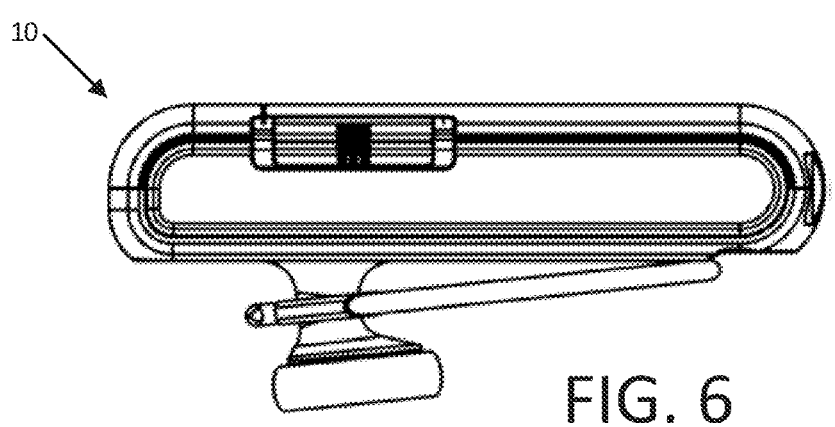
FIG. 6 is a bottom plan view of FIG. 1 of the wireless headset of FIG. 1.
Figure 7:
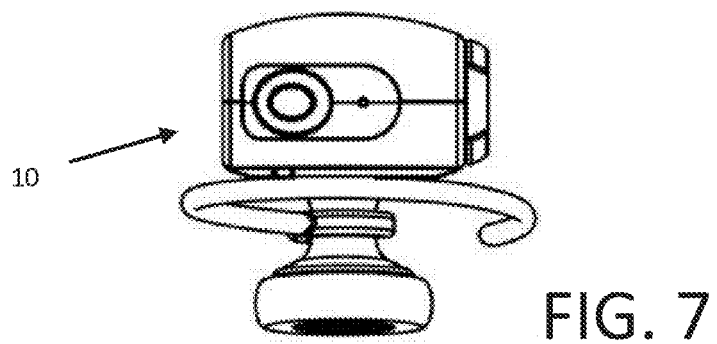
FIG. 7 is an end plan view of the wireless headset of FIG. 1.

FIGS. 5-7 show top, bottom, and end views of wireless headset, respectively.

Figure 8:
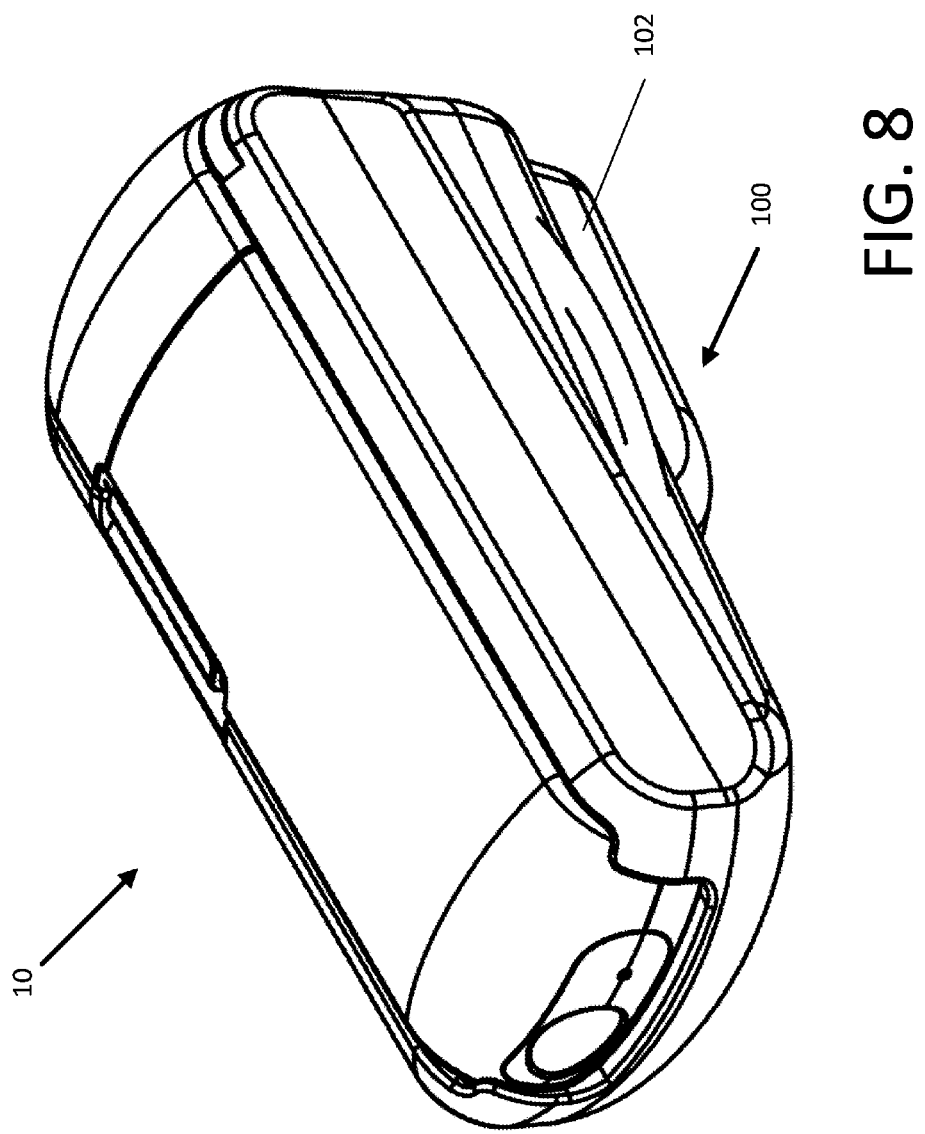
FIG. 8 is a perspective view of the wireless headset of FIG. 1 docked in a holster, according to one embodiment.
Figure 9:
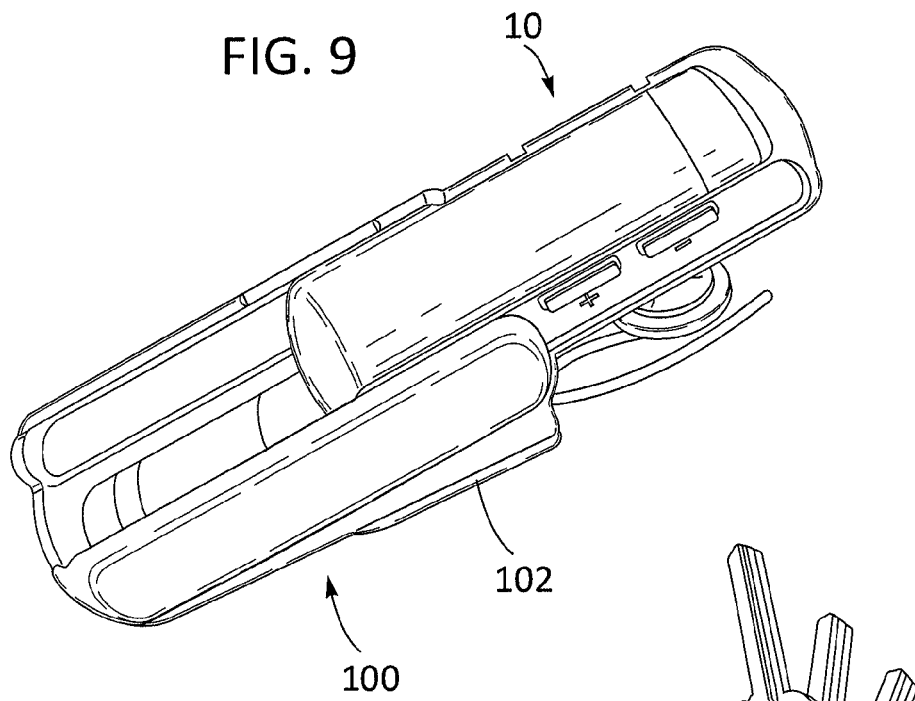
FIG. 9 is a perspective view of the wireless headset of FIG. 1 and the holster of FIG. 8, showing the headset partially removed from the holster.

FIGS. 8 and 9 show a holster device 100 for wireless headset 10, according to one embodiment. As best shown by FIG. 9, the holster device 100 is configured to receive wireless headset 10 such that wireless headset 10 can be protected and/or transported more easily. For example, holster device 100 protects loudspeaker 14 and clip 16 of the wireless headset 10 from snagging when being placed in or removed from a pocket or purse, as best shown in FIG. 8. Holster device 100 can comprise a securing mechanism 102. For example securing mechanism 102 can comprise a clamp, which can allow a user to secure the holster device 100 and the wireless headset 10 to a pocket, belt, strap, etc.

Figure 10:
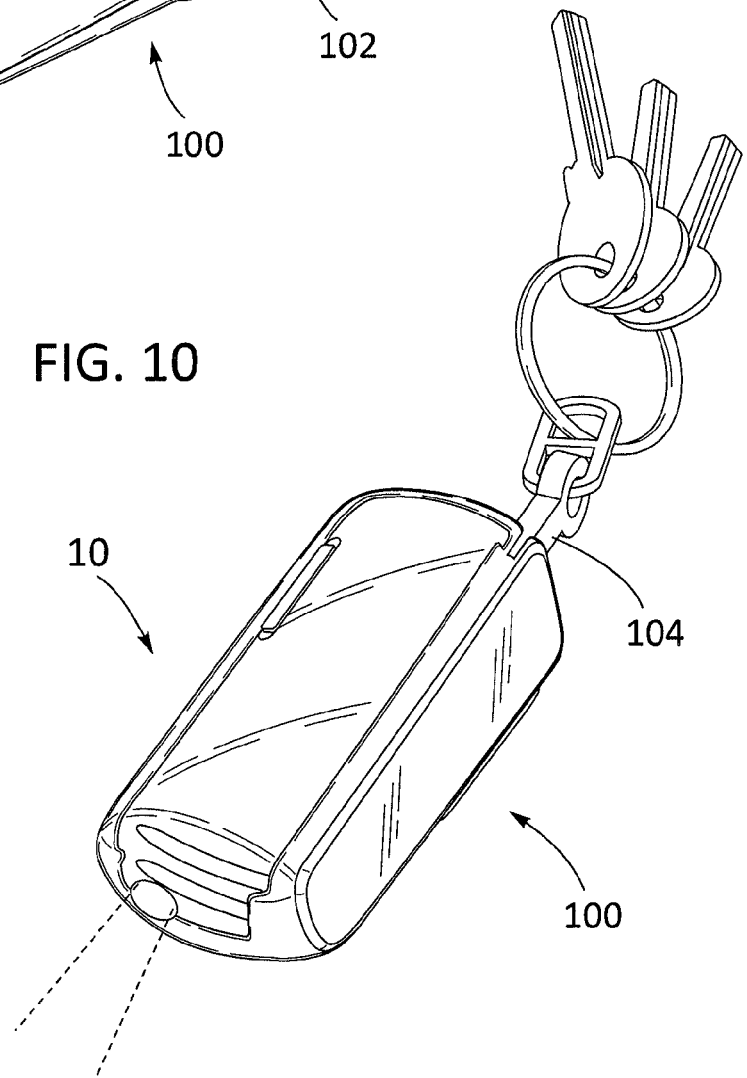
FIG. 10 is a perspective view of the wireless headset of FIG. 1 docked in a holster, according to another embodiment.

FIG. 10 shows a holster device 100, according to another embodiment. This embodiment the holster device can comprise an accessory loop 104. For example, accessory loop 104 can be used to connect the holster device 100 to keychain, lanyard, etc.

Referring now to FIGS. 11-13, there is shown a wireless headset 200 and a holster device 300 configured to receive wireless headset 200, according to another embodiment. Wireless headset 200 can comprise a microphone 202, a loudspeaker 204, a switch 206, plurality of volume buttons 208, an accept/reject call button 210, a light 212, a flashlight 214, and a port 216. For example, wireless headset 200 and the components of wireless headset 200 can be configured in a manner similar to wireless 10 and the components of wireless headset 10. Holster device 300 can be configured, for example, similarly to holster device 100. For example, holster device 300 can comprise an accessory loop 302 configured to receive keys.

Although the wireless headsets 10, 200 illustrated herein are monaural wireless headsets, wireless headsets 10, 200 can comprise stereophonic headsets. Thus, wireless headsets 10, 200 can be configured to receive a wireless stereo transmission from an advanced audio distribution profile source ("A2DP"). For example, wireless headsets 10, 200 can be configured to receive stereo audio from an A2DP computer or phone. Wireless headsets 10, 200 can be configured to support 32-bit File Allocation Table ("FAT32") file systems.

Wireless headsets 10, 200 can also comprise various elements for improving ergonomics, such as variations of clip 16 or other removable or extendable elements.

Figure 14:
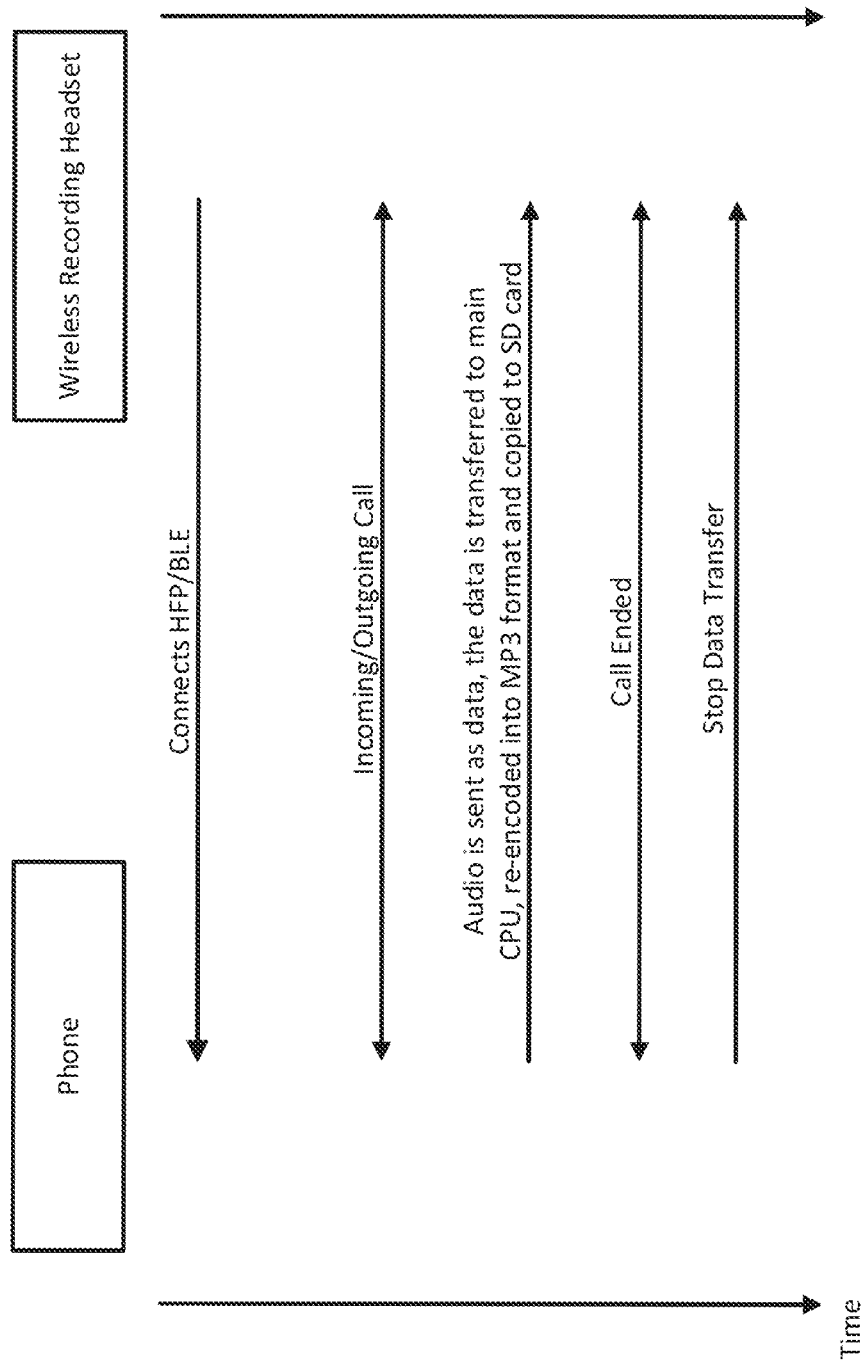
FIG. 14 is a diagram illustrating the general steps of a BLUETOOTH headset connecting and recording process when paired with a phone.
Figure 15:
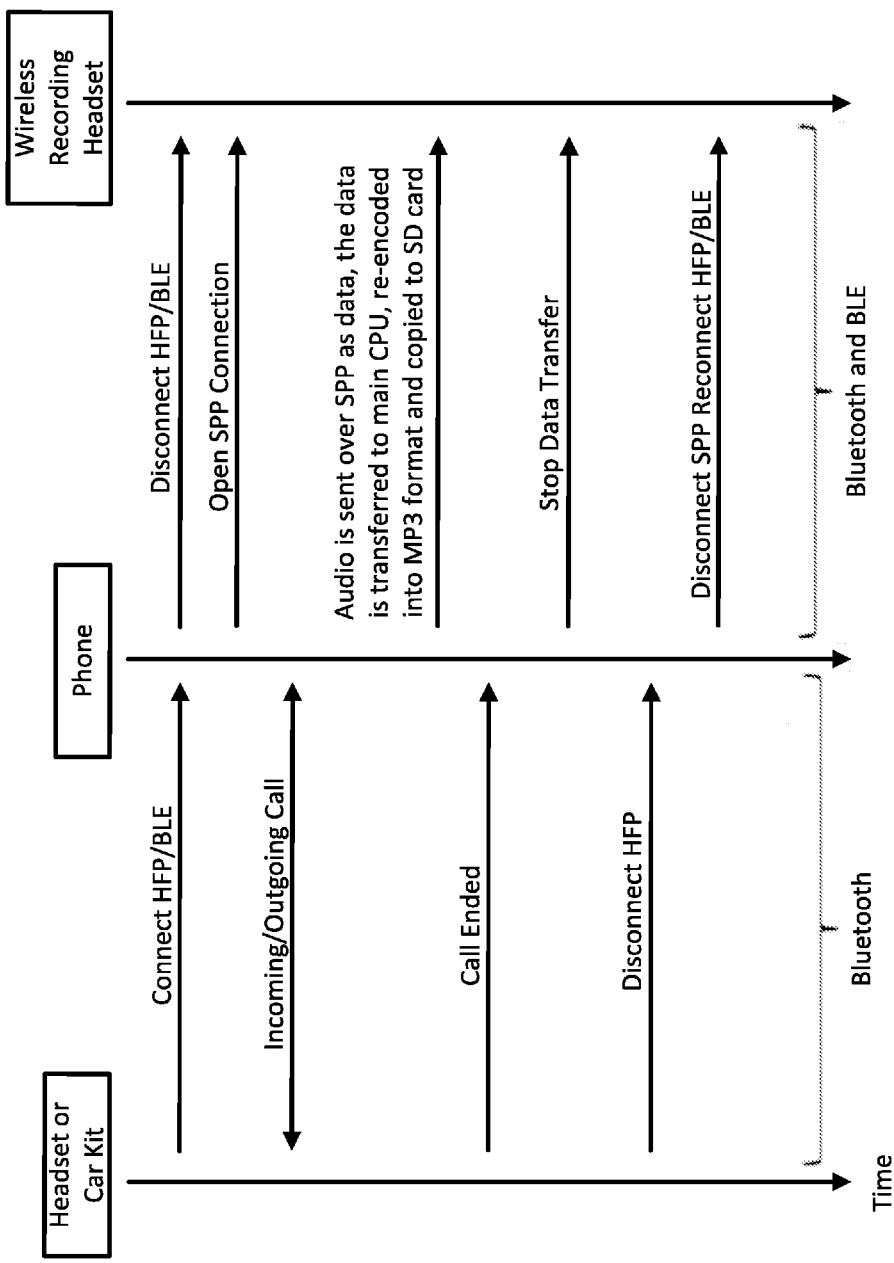
FIG. 15 is a diagram illustrating the general steps of a BLUETOOTH headset connecting and recording process when paired with a phone and an additional device.

Referring now to FIGS. 14 and 15, there is shown how wireless headsets can connect to a communication device (e.g., mobile phone, computer, tablet, etc.) and record calls using software that can be installed on the wireless recording headset and a software application that can be installed on a communication device. For example, software can be installed on wireless headsets 10 and 200 enabling wireless headsets 10 and 200 to be able to record calls received on a mobile phone as shown in FIGS. 14 and 15.

For example, FIG. 14 is a diagram generally illustrating the steps of a BLUETOOTH headset connecting and recording processes when paired with a phone, comprising the software and application described herein. A wireless recording headset can initiate a BLUETOOTH connection with a phone over the Hands-Free Protocol ("HFP") or the BLUETOOTH Low Energy Protocol ("BLE"). Once the wireless headset is connected (also referred to as "paired") with the phone, the wireless headset can send or receive calls. The wireless recording headset records incoming or outgoing calls made with either the phone or with the wireless headset as long as the devices are within BLUETOOTH range. This range is approximately 10 meters, generally speaking. While the call is in progress and being communicated via the phone, the incoming and outgoing audio signals can be captured by the phone and sent from the phone's BLUETOOTH module to the wireless recording headset's BLUETOOTH module as data. The wireless recording headset can then receive the data with the BLUETOOTH module of the phone and transfer it to the main Central Processing Unit ("CPU"), re-encoded it into a compressed format (e.g., MP3 format), and store it to the memory unit of the wireless recording headset. For example, the memory unit of the wireless recording headset can be a Secure Digital ("SD") memory card. When a call is ended, the data transfer stops. The data can also be encrypted for security. While the call is in progress and being communicated via the wireless recording headset, the outgoing audio signals from the user of the wireless recording headset are captured by the microphone of the wireless recording headset and the incoming audio signals are captured by the phone and set to the wireless recording headset as data as described above.

To access a recording of a conversation, the user can connect the wireless recording headset to a computer. For example, wireless headsets 10, 200 can be connected to a computer via the ports 38, 216, respectively. The files can then be downloaded from the wireless recording headset, and the user can then listen to them on the computer. The user can also access a recording of a conversation by opening the application on the mobile phone and selecting the desired call to playback from the calls list. The wireless recording headset will then send the files to the phone via BLUETOOTH. A user can select one or a plurality of files to send. In addition, a user can transfer files from the wireless recording headset to another device by placing or tapping the wireless recording headset proximate to a NFC enabled phone.

FIG. 15 is a diagram generally illustrating the steps of a BLUETOOTH headset connecting and recording processes when connected with a phone that is also connected to an additional BLUETOOTH device, comprising the software and application described herein. For example, the phone can be paired to the wireless recording headset and also paired to a car with built-in BLUETOOTH capabilities or paired to another BLUETOOTH headset. FIG. 15 shows a wireless recording headset, e.g., wireless headsets 10, 200; a phone; and an additional device, a BLUETOOTH headset or car kit. If the wireless recording headset is connected to the phone by HFP or BLE when the headset or car kit by HFP, the wireless recording headset disconnects the HFP or BLE connection. The wireless recording device can then open a Serial Port Protocol ("SPP") connection with the phone. If the user receives or makes an incoming or outgoing call, the audio is sent as data over the SPP connection. The wireless recording headset can then receive the data and transferred to the main CPU, re-encoded it into MP3 format, and copy it to the memory unit of the wireless recording headset. When a call is ended, the data transfer stops. When the phone is disconnected from the headset or car kit, the HFP between the phone and the headset or car kit can be terminated. The wireless recording headset can then disconnect the SPP connection and can reconnect the HFP or BLE connection. Files can be transferred as described above. Thus, by recording the call using the SPP, the wireless recording headset can record a HFP call that the wireless recording headset is not a part of.

The wireless headset and the recording process described herein is advantageous over other recording systems for a variety of reasons. One advantage, for example, is that the wireless headset does not require the user to communicate using the wireless headset for the conversation to be recorded. The wireless headset can record a conversation communicated between devices using the HFP, even if the wireless headset is not using the HFP. This is advantageous because it provides a user with options to choose a BLUETOOTH hands-free device to use to communicate without sacrificing the ability to record the conversation. For example, a user can use a BLUETOOTH headset without recording capabilities which the user prefers due to, e.g., ergonomics, functionality, brand, aesthetics, etc. A user can pair the BLUETOOTH headset without recording capabilities to a mobile phone using the HFP and also pair the wireless headset described herein to the mobile phone. When the user has a phone conversation, the wireless headset can record the call, regardless of which device was used to communicate. The recording capabilities of the wireless headset can also be used with any BLUETOOTH-connected device(s), e.g., computers, cars, etc. Another advantage is that the wireless headset is not merely a microphone recording of the audible sounds proximate to the wireless headset, which would only record one side of a conversation and include unwanted background noise. The wireless headset described herein records audio signals from both sides of a conversation, which are transmitted as data using a non-HFP, such as a SPP. By recording audio signals as data rather than only audible sounds proximate to the microphone, the wireless headset can record both sides of a conversation with improved quality. Therefore, the wireless headset greatly improves the ability of a user to record conversations communicated via BLUETOOTH.

The wireless headsets 10, 200 can also be configured to record voice memorandums. For example, a user can record a voice note without placing a call. Wireless headsets 10, 200 can also be configured to control various functions of a device that is paired with wireless headsets 10, 200. For example, wireless headsets 10, 200 can be configured to control the camera shutter function of a mobile phone's camera application.

Wireless headsets 10, 200 can be paired with any compatible device. For example, wireless headsets 10, 200 can be paired to a personal computer, laptop, home telephone, etc. Thus, wireless headsets 10, 200 can, for example, record Skype, Viber, and Voice over Internet Protocol ("VoIP") calls.

It should be noted that the term "mobile phone" as used herein includes wireless telephones, cellular telephones, smartphones, etc. It should also be noted that the term "mobile communication devices" includes laptop computers, tablet computers (e.g., iPad), mobile phones, etc. Communication devices include computers, telephones, etc. The term "phone" includes telephones. The term "computer" includes personal computers, home computers, etc., including computers running a variety of operating systems (e.g., Windows, Mac, etc.)

Accordingly, the systems and methods described above provide novel recording features that can be incorporated with various standard headset or earphone technology along with other convenience interfaces and features, such as wireless charging, NFC, USB OTG, and other accessories like flashlights.

As discussed above, by using various software applications, including iOS, Android, and PC applications, the systems and methods described herein provide various advanced and innovative features. A brief summary of some of the functions and operations, as described in detail above, is provided below:

Conversation Recording on Local Storage while System is Paired as Hands-Free Device with a Mobile Phone ("Recording Process"):
 a. System can use pre-defined recording parameters or recording parameters can be individually selected for a particular recording;
 b. When in Recording mode, upon "accepted call", the system can open a new file on its storage device;
 c. The system can capture the incoming audio (from BLUETOOTH) and outgoing audio (from its local microphone);
 d. The system can encode the conversation audio, encrypt (if enabled by the system) the data and record the audio into the file;
 e. Upon "call end", the system can close the current recording file.

Local or Remote Conversation Playback:
a. System can be pre-defined for playback location (e.g., locally on the system or remotely via BLUETOOTH on a mobile phone or other device);
b. System can receive the list of files and prepare one or more files for playback;
c. In local playback, the system can read the file(s), decrypt (if encrypted) the data and decoded the audio into local speaker;
d. For remote playback, the system can read the file(s), decrypt (if encrypted) the data and sends the audio as data to a mobile phone or other device to be decoded by the system (e.g., an app on the device).

Voice Memo Recording:
a. Upon a user's request, the system can opens a new file on its local storage device;
b. The system can capture Microphone audio, encode data, encrypt (if enabled by the system or app) the data and record into one or more files;
c. Upon a user's request, or after a pre-defined time, the file is closed.

Conversation and Voice Memo Files Uploading:
a. The system can define an uploading channel (USB OTG or BLUETOOTH);
b. For BLUETOOTH, the system can get a list of files and files can be selected for uploading;
c. For USB OTG, the system is detected on a PC as mass-storage-device and storage files can be copied as desired;
d. In some embodiments, NFC detection can trigger the last file upload via BLUETOOTH.

"Remote Recording Process" (Operation without being Paired as Hands-Free Device):
a. A call can be accepted and executed on the mobile phone;
b. The system can be directed to indicate an "accepted call," which opens a new file;
c. The system (e.g., via an app on a communications device) can capture incoming and outgoing audio;
d. The captured audio can be transferred as data to the system (e.g., the recording device separate from the communication device);
e. When the recording is to be stopped, an indication of "call end" is provided to the system, which closes the current recording time.

"Remote Recording Process" with Mobile Phone Paired with Other Hands-Free Devices (e.g., BLUETOOTH Car Kit or Headset)
a. A call is accepted and executed on the hands-free device;
b. The system activates the "Remote Recording Process" described above.

Direct Conversation Between Mobile Phone and System:
a. A mobile phone user and system user may hold a direct conversation within the BLUETOOTH connectivity range;
b. The system can initiate a conversation;
c. Speech made into the mobile phone microphone will be heard in high volume on the system's speaker;
d. Speech made into the system's microphone will be heard on the mobile phone's speaker Additional advanced connection and detection alerts can also be provided with the system. For example, the system can provide an alert when pairing disconnects. The system can also be used to translate BLUETOOTH signal level into distance information that can be provided to a user. The system can receive an input from the user (e.g., via button press, screen input, or via a motion-input (accelerometer indication), to send a "detection" message. In some embodiments, the system can be programmed to enter into a power-saving mode after being 90 minutes out of BLUETOOTH range. When the system is detected as being back in range, the system can be "woke up," either automatically or upon user selection.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A headset device capable of recording audio signals, comprising:
a signal transfer module for transmitting and receiving wireless radio signals, the signal transfer module being configured to receive outgoing audio signals generated by a user on a remote device and incoming audio signals received by the remote device, and wherein the signal transfer module is configured to receive the outgoing and incoming audio signals from the remote device via an intermediate device when the intermediate device is paired with the remote device over a first wireless signal protocol and paired with the headset device over a second wireless signal protocol;
an audio encoder/decoder for encoding the outgoing and incoming audio signals received by the signal transfer module to generate data;
a memory unit for storing the data generated by the audio encoder as a recording;
a speaker, connected to the audio encoder/decoder, for playing the recording to the user; and
a control unit which is coupled to the audio encoder/decoder for transferring the data to the memory unit.

2. The headset device of claim 1, wherein the remote device is a hands-free communication system in an automobile, and the intermediate device is a mobile telephone.

3. The headset device of claim 1, wherein the first wireless signal protocol is a BLUETOOTH Hands-Free Protocol, and the second wireless signal protocol is a BLUETOOTH Serial Port Protocol.

4. The headset device of claim 1, wherein the control unit converts the data generated by the audio encoder/decoder from a first format to a second data format prior to transferring the data to the memory unit.

5. The headset device of claim 4, wherein the second data format is a compressed or an encrypted data format relative to the first data format.

6. The headset device of claim 1, wherein the signal transfer module of the headset device can transmit the data stored on the memory unit of the headset device to the intermediate device, wherein the intermediate device:
receives the data with the a signal transfer module of the intermediate device;
decodes the data into audio signals, wherein the intermediate device comprises an audio encoder/decoder for decoding the data received by the signal transfer module; and
plays the recording over a speaker of the intermediate device.

7. The headset device of claim 1, further comprising: a near-field communication module for transmitting the data stored in the memory unit of the headset device to the intermediate device, wherein the intermediate device comprises:

a near-field communication module for receiving the data transmitted to the intermediate device from the near-field communication module of the headset device;

an audio encoder/decoder for decoding the data received by the near-field communication module of the intermediate device into audio signals; and a speaker for playback of the audio signals.

8. The headset device of claim 1, further comprising:

an accelerometer module, wherein the accelerometer module can be configured to receive an input from the user, interpret the input to generate an output signal, and send the output signal to the signal transfer module; and wherein the signal transfer module of the headset device can transmit the output signal to another device comprising a signal transfer module which can receive the output signal to generate feedback to the user based on the input provided by the user.

9. The headset device of claim 1, further comprising a flashlight.

10. A method of recording audio signals on a headset device, comprising:

receiving, via a signal transfer module of the headset device, outgoing audio signals generated by a user on a remote device and incoming audio signals received by the remote device, wherein the signal transfer module receives the outgoing and incoming audio signals from the remote device via an intermediate device when the intermediate device is paired with the remote device over a first wireless signal protocol and paired with the headset device over a second wireless signal protocol;

encoding the outgoing and incoming audio signals received by the signal transfer module with an audio encoder/decoder of the headset device to generate data;

storing the data on a memory unit of the headset device as a recording, wherein the headset device comprises a control unit which is coupled to the audio encoder/decoder for transferring the data to the memory unit; and playing the recording on a speaker connected to the audio encoder/decoder.

11. The method of claim 10, wherein the remote device is a hands-free communication system in an automobile, and the intermediate device is a mobile telephone.

12. The method of claim 10, wherein the first wireless signal protocol is a BLUETOOTH Hands-Free Protocol and the second wireless signal protocol is a BLUETOOTH Serial Port Protocol.

* * * * *